United States Patent
Said et al.

(10) Patent No.: US 9,459,027 B2
(45) Date of Patent: Oct. 4, 2016

(54) INTERMITTENT ABSORPTION REFRIGERATION SYSTEM

(71) Applicant: KING FAHD UNIVERSITY OF PETROLEUM AND MINERALS, Dhahran (SA)

(72) Inventors: Syed A. M. Said, Dhahran (SA); Muhammad Umar Siddiqui, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 303 days.

(21) Appl. No.: 14/259,074

(22) Filed: Apr. 22, 2014

(65) Prior Publication Data

US 2015/0300702 A1  Oct. 22, 2015

(51) Int. Cl.

| F25B 17/00 | (2006.01) |
|---|---|
| F25B 27/00 | (2006.01) |
| F25B 35/02 | (2006.01) |
| F25B 17/02 | (2006.01) |
| F25B 41/00 | (2006.01) |
| F25B 15/00 | (2006.01) |
| F25B 29/00 | (2006.01) |
| F25B 30/04 | (2006.01) |

(52) U.S. Cl.
CPC ............. *F25B 27/007* (2013.01); *F25B 17/00* (2013.01); *F25B 17/02* (2013.01); *F25B 27/00* (2013.01); *F25B 35/02* (2013.01); *F25B 41/00* (2013.01); *F25B 15/006* (2013.01); *F25B 29/006* (2013.01); *F25B 30/04* (2013.01)

(58) Field of Classification Search
CPC ...... F25B 17/02; F25B 27/007; F25B 27/00; F25B 17/00; F25B 35/02; F25B 15/006; F25B 29/006; F25B 30/04

USPC .......................................................... 62/477
See application file for complete search history.

(56) References Cited

U.S. PATENT DOCUMENTS

| 3,440,832 A | 4/1969 | Aronson |
| 3,742,726 A | 7/1973 | English |
| 4,732,008 A | 3/1988 | DeVault |
| 5,038,574 A | 8/1991 | Osborne |
| 5,666,818 A * | 9/1997 | Manrique-Valadez . F25B 33/00 62/235.1 |
| 7,239,301 B2 | 7/2007 | Liberty et al. |
| 2010/0192602 A1 | 8/2010 | Brooks et al. |
| 2011/0247351 A1 | 10/2011 | Alston |

FOREIGN PATENT DOCUMENTS

| JP | 2011-133123 | 7/2011 |
| WO | WO 2009/107383 A1 | 9/2009 |

* cited by examiner

*Primary Examiner* — Marc Norman
*Assistant Examiner* — David Tietelbaum
(74) *Attorney, Agent, or Firm* — Richard C. Litman

(57) ABSTRACT

The intermittent absorption refrigeration system includes a primary circuit having a generator/absorber, a dephlegmator, a condenser, an evaporator, and solar collectors to provide heat to the generator. The system also includes an ejector-based secondary circuit having a generator/absorber, an ejector, a condenser, a refrigerant storage unit, and solar collectors. Both circuits are aqua-ammonia systems, using ammonia as the refrigerant and water as the absorber liquid. The ejector permits evaporation during the daytime and storage of liquid ammonia refrigerant that is used for cooling in the heat exchanger of the primary circuit condenser and in the primary circuit absorber, thus permitting the primary circuit evaporator to operate at lower temperatures for low temperature freezing applications in the daytime, even at high ambient temperature.

7 Claims, 1 Drawing Sheet

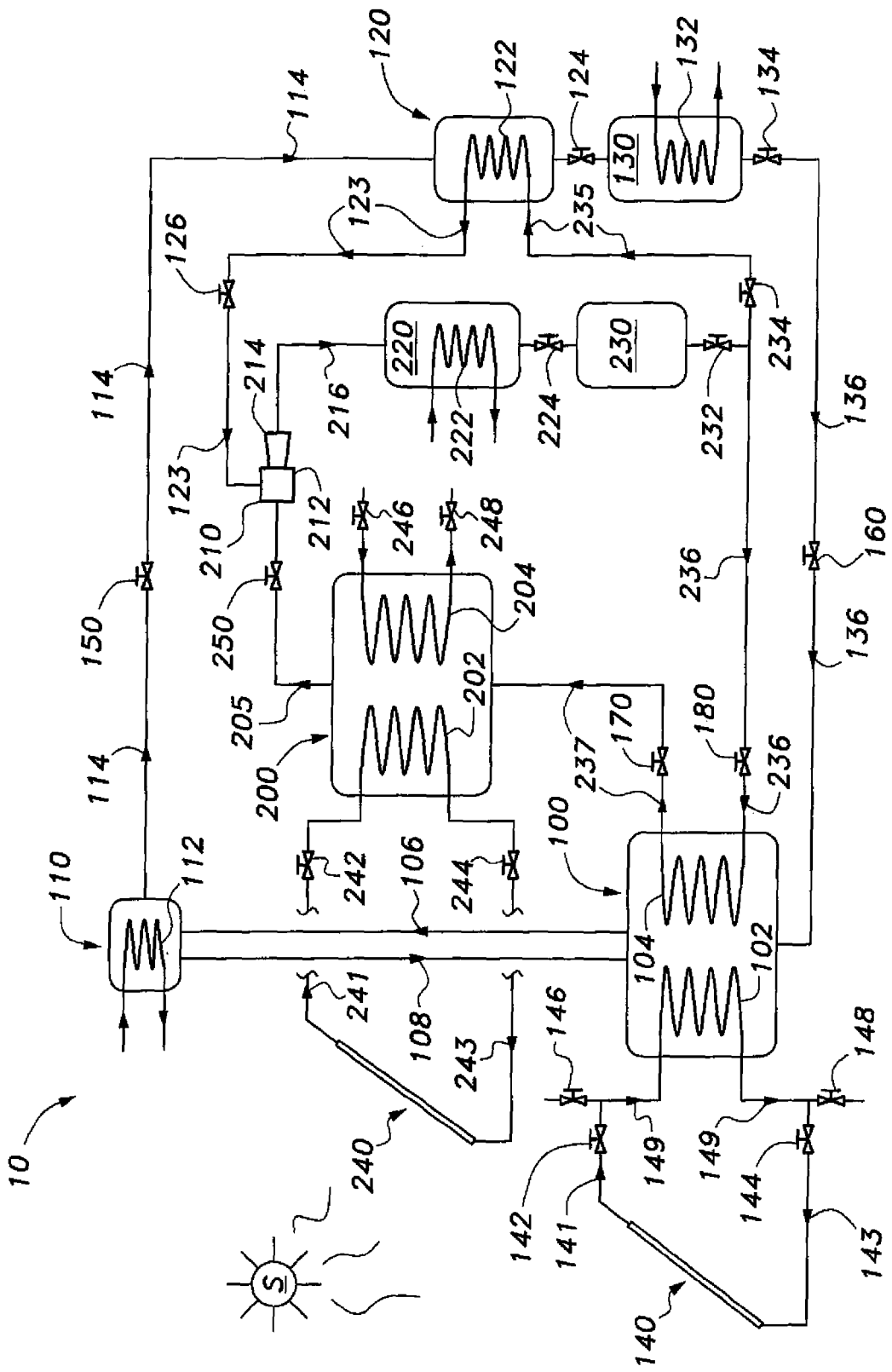

INTERMITTENT ABSORPTION REFRIGERATION SYSTEM

BACKGROUND OF THE INVENTION

1. Field of the Invention

The present invention relates to refrigeration systems, and particularly to an intermittent absorption refrigeration system that has a primary solar-powered intermittent absorption refrigeration system and an integrated ejector-based secondary solar-powered intermittent absorption refrigeration system for efficiently producing low temperatures for freezing applications in areas with high ambient temperature.

2. Description of the Related Art

Conservation of energy, namely electricity, in both the production and consumption sectors, is continuing to be a worldwide priority. One such area is in the development of air-conditioning and refrigeration systems. It is no surprise that the days, times, and locations requiring maximum cooling loads coincide with the days and times with the highest temperatures and locations with the hottest climates. Conventional air-conditioning and refrigeration systems are powered using electricity. In the areas with the hottest climates and during the days and times with the hottest temperatures, the use of electricity to power such air-conditioning and refrigeration systems becomes very expensive and inefficient.

Solar power can be utilized to provide power for refrigeration and air-conditioning systems. Absorption chillers, for example, can use solar energy to produce refrigeration. Absorption chillers can be classified into two different categories, namely, continuous operation systems and intermittent operation systems. The difference between the two systems lies in their mode of operation. For example, in continuous systems both generation and absorption of energy take place at the same time in a continuous manner, whereas in intermittent systems, the generation and absorption of energy do not take place at the same time. Instead the generation and absorption of energy follow each other intermittently within the operation of the system.

Conventional intermittent absorption systems, however, can only produce the requisite cooling capacity for low temperature freezing applications at nighttime, since they cannot efficiently achieve the required high generation temperatures, low condenser temperatures, and low absorption temperatures needed to produce the cooling capacity required for low temperature freezing applications during the daytime in areas with high ambient temperatures, for example, at 45° C. Moreover, in conventional intermittent absorptions systems, high generation temperatures require the use of expensive concentrators in addition to solar collectors, which considerably increases the overall capital cost of such systems. This significant increase in capital cost, therefore, makes conventional intermittent absorptions systems cost prohibitive and not economically feasible.

Thus, an intermittent absorption refrigeration system solving the aforementioned problems is desired.

SUMMARY OF THE INVENTION

The intermittent absorption refrigeration system includes a primary circuit having a generator/absorber, a dephlegmator, a condenser, an evaporator, and solar collectors to provide heat to the generator. The system also includes an ejector-based secondary circuit having a generator/absorber, an ejector, a condenser, a refrigerant storage unit, and solar collectors. Both circuits are aqua-ammonia systems, using ammonia as the refrigerant and water as the absorber liquid. The ejector permits evaporation during the daytime and storage of liquid ammonia refrigerant that is used in the heat exchanger of the primary circuit condenser and in the primary circuit absorber, thus permitting the primary circuit evaporator to operate at lower temperatures for low temperature freezing applications during the daytime, even at high ambient temperature.

These and other features of the present invention will become readily apparent upon further review of the following specification and drawings.

BRIEF DESCRIPTION OF THE DRAWINGS

The sole drawing FIGURE is a schematic diagram of an intermittent absorption refrigeration system according to the present invention.

Similar reference characters denote corresponding features consistently throughout the attached drawings.

DETAILED DESCRIPTION OF THE PREFERRED EMBODIMENTS

The intermittent absorption refrigeration system includes a primary circuit having a generator/absorber, a dephlegmator, a condenser, an evaporator, and solar collectors to provide heat to the generator. The system also includes an ejector-based secondary circuit having a generator/absorber, an ejector, a condenser, a refrigerant storage unit, and solar collectors. Both circuits are aqua-ammonia systems, using ammonia as the refrigerant and water as the absorber liquid. The ejector permits evaporation during the daytime and storage of liquid ammonia refrigerant that is used in the heat exchanger of the primary circuit condenser and in the primary circuit absorber, thus permitting the primary circuit evaporator to operate at lower temperatures for low temperature freezing applications during the daytime, even at high ambient temperature.

As shown in the sole drawing, the intermittent absorption refrigeration system 10 includes a primary intermittent absorption refrigeration system having a generator/absorber unit 100, a dephlegmator unit 110, a condenser unit 120, an evaporator unit 130, and solar collector panels 140 that generate power from the sun S. The solar collector panels 140 heat a fluid that is in communication with a first heat exchanger 102 in the generator/absorber unit 100 when valves 142 and 144 are open to provide heat to generate an aqua-ammonia vapor from an aqua-ammonia solution. The generator/absorber unit 100 is in communication with the dephlegmator unit 110, which removes water from the vapor and returns the water to the generator/absorber unit 100. The rectified ammonia in the dephlegmator unit 110 is in communication with the condenser unit 120 through a ball valve 150. The condenser unit 120 is in communication with the evaporator unit 130. The evaporator unit 130 is in communication with the generator/absorber unit 100 through a throttling valve 160. Accordingly, within the primary system or circuit, the generator/absorber unit 100 is separated from the condenser unit 120 and the evaporator unit 130 by the ball valve 150 and the throttling valve 160. It is important to note that the valves 150, 160 are not limited to ball valves and throttling valves, but can also include such valves as check valves, gate valves, globe valves, and butterfly valves.

Due to the intermittent nature of the primary intermittent absorption refrigeration system, the generator/absorber unit 100 behaves as a generator during the daytime and behaves as an absorber during the nighttime. The generator/absorber unit 100 houses the first heat exchanger 102 for heating purposes when the generator/absorber unit 100 is behaving as a generator during the daytime, and a second heat exchanger 104 for cooling purposes when the generator/absorber unit 100 is behaving as an absorber during the nighttime.

During the daytime, at the start of the process, heat energy is generated by the solar collectors 140 from conversion of the energy of the sun S and used to heat a heat exchange fluid. As illustrated by arrows 141 and 143, the heat exchange fluid is transferred from the solar collector panels 140 to the first heat exchanger 102 within the generator/absorber unit 100 by opening valves 142 and 144. Valves 146, 148, 170, and 180 are kept closed during this time. As the temperature within the generator/absorber unit 100 increases, the aqua-ammonia mixture contained within the generator/absorber unit 100 is heated at a constant pressure. This heat generation process will continue to take place, so long as the heated heat exchange fluid passes to the first heat exchanger 102 within the generator/absorber unit 100 through valves 142 and 144.

As a result of the heat generation process, the temperature of the aqua-ammonia solution within the generator/absorber unit 100 increases and generates aqua-ammonia vapor from the liquid mixture. The generation of vapor causes the concentration of the mixture in the generator/absorber unit 100 to decrease. As the concentration of the mixture in the generator/absorber unit 100 decreases, the temperature within the generator/absorber unit 100 increases further, thereby generating vapor with more water content than would have been generated at lower temperatures.

The vapor must then be rectified to isolate the ammonia refrigerant from water vapors to achieve evaporating temperatures below the freezing point of the absorbent (water). This can be accomplished through the use of the dephlegmator unit 110, which can be located above the generator/absorber unit 100, to eliminate the maximum amount of absorbent (water) from the vapor. The dephlegmator 110 is, in effect, a reflux condenser that removes water from the aqua-ammonia vapor and returns the water to the generator/absorber unit, thereby decreasing the concentration of ammonia in the mixture left in the generator/absorber unit 100. The dephlegmator unit 110 houses a heat exchange coil 112 for cooling purposes. Once the vapor, which is generated in the generator/absorber unit 100, rises from the generator/absorber unit 100 to the dephlegmator unit 110, as illustrated by the arrow 106, the vapor is cooled above the condenser temperature of the refrigerant by the heat exchange coil 112 within the dephlegmator unit 110. The separation of the water from the vapor produces a rectified ammonia vapor. The water condensate returns from the dephlegmator unit 110 to the generator/absorber unit 100, as illustrated by arrow 108, and the rectified ammonia refrigerant vapor moves to the condenser unit 120 through ball valve 150, as illustrated by arrows 114. The ammonia vapor is utilized to achieve evaporating temperatures below the freezing point of water.

The condenser unit 120 houses a heat exchanger 122 for cooling purposes. Once in the condenser unit 120, the purified ammonia vapor is condensed inside the condenser unit 120 by rejecting heat to the coolant inside the heat exchanger 122. This produces a purified refrigerant condensate, namely, ammonia condensate. The purified ammonia condensate then passes through valve 124 and is stored as saturated liquid ammonia inside the evaporator unit 130 during the daytime. The evaporator unit 130 houses a heat exchange coil 132 for cooling purposes. The saturated liquid ammonia refrigerant in the evaporator 130 is utilized for cold production at nighttime to be used for low temperature freezing applications.

At the start of the day, generator/absorber unit 100 will be filled with a cold, strong aqua-ammonia solution, whereas the evaporator unit 130 will be empty. However, as a result of the daytime operation, the generator/absorber unit 100 will be filled with hot, weak aqua-ammonia solution, whereas the evaporator unit 130 will be completely filled with saturated liquid ammonia refrigerant. By the start of the nighttime, the generation process is followed by a depressurization process in the generator/absorber unit 100. In order for the depressurization process to take place, the solar collector unit 140 must be isolated by closing valves 142 and 144. Valves 146 and 148, which are coupled to the first heat exchanger 102, must be opened to allow a coolant, such as cool air, to flow though the first heat exchanger 102 within the generator/absorber unit 100, as illustrated by arrows 149. The opening of valves 146 and 148 causes the temperature and the pressure to decrease within the generator/absorber unit 100.

Throughout nighttime operation, the generator/absorber unit 100 behaves as an absorber. Depressurization of the generator/absorber unit 100 continues to take place by the rejection of heat from the generator/absorber unit 100 by the first heat exchanger 102 within generator/absorber unit 100. During depressurization, the saturated liquid ammonia refrigerant contained in the evaporator unit 130 is kept isolated by keeping ball valve 150 and throttling value 160 closed. After the depressurization is complete, the ball valve 150 and the throttling value 160 will be opened. This reduces the pressure inside the evaporator unit 130 and produces a refrigeration effect in the heat exchange coil 132 within the evaporator unit 130 due to the evaporation of the saturated liquid ammonia refrigerant. The heat exchange coil 132 within the at least one evaporator unit 130 is therefore required to be filled with a brine solution to prevent choking the heat exchange coil 132 within the at least one evaporator unit 130 due to freezing, since the evaporation temperature is below the freezing point of water.

As illustrated by arrows 136, the ammonia refrigerant vapor then proceeds through valve 134 to be throttled through throttling valve 160 into the generator/absorber unit 100, where it is absorbed into the cold, weak aqua-ammonia solution, thus producing a cold, strong aqua-ammonia solution by rejecting the heat of absorption to the second heat exchanger 104 in the generator/absorber unit 100. The heat rejection during the nighttime from generator/absorber unit 100 will be carried out by the first heat exchanger 102 during the depressurization process and by the second heat exchanger 104 during the absorption process.

The secondary intermittent absorption refrigeration system includes a generator/absorber unit 200, an ejector unit 210, a condenser unit 220, a refrigerant storage unit 230, and a solar collector unit 240 that generates electrical power from the sun S. The power from the solar collector 240 heats a fluid that is in communication with a first heat exchanger 202 in the generator/absorber unit 200 when valves 242 and 244 are open to provide heat to generate an aqua-ammonia vapor. The generator/absorber unit 200 is in communication with the ejector unit 210 when ball valve 250 is open. The ejector unit 210 is in communication with the condenser unit 220. The condenser unit 220 is in communication with the refrigerant storage unit 230. During the daytime, the refrigerant storage unit 230 is in communication with the condenser unit when the throttling valve 232 and the ball valve 234 are open, while at nighttime, the refrigerant storage unit 230 is in communication with the generator/absorber unit 100 when throttling valve 232 and ball valve 180 are open. The valves used in the secondary circuit are not limited to ball valves and throttling valves, but can also include such valves as check valves, gate valves, globe valves, and butterfly valves.

Due to the intermittent nature of the secondary circuit, the generator/absorber unit 200 behaves as a generator during the day and an absorber during the night. The generator/absorber unit 200 houses a first heat exchanger 202 for heating purposes when the generator/absorber unit 200 is behaving as a generator, and a second heat exchanger 204 for cooling purposes when the generator/absorber unit 200 is behaving as an absorber.

During the daytime, at the start of the process, heat energy is generated by the solar collectors 240 from conversion of the energy of the sun S and used to heat a heat exchange fluid. As illustrated by arrows 241 and 243, the heat exchange fluid is transferred from the solar collector panels 240 to the first heat exchanger 202 by opening valves 242 and 244. Valves 246 and 248 are kept closed during this time. As the temperature within the generator/absorber unit 200 increases, the aqua-ammonia solution contained within the generator/absorber unit 200 is heated at a constant pressure, thus generating aqua-ammonia vapors. This vapor generation process will continue to take place so long as the energy, in the form of heat, passes to the first heat exchanger 202 through valves 242 and 244.

The temperature of the aqua-ammonia solution within the generator/absorber unit 200 increases, and aqua-ammonia vapor is generated from the liquid mixture. The conversion into vapor causes the concentration of strong aqua-ammonia solution in the generator/absorber unit 200 to decrease. As the concentration of strong aqua-ammonia solution decreases, the temperature within the generator/absorber unit 200 increases further.

Although the water content in the aqua-ammonia vapor generated in the generator/absorber 200 continues to increase, it is not necessary to separate the water from the vapor using a dephlegmator. The dephlegmator 110 was used in the primary circuit to obtain pure ammonia to enable the evaporator 120 in the primary circuit to operate at temperatures below the freezing point of water. However, evaporation in the secondary circuit occurs at temperatures above the freezing point of water, so that a dephlegmator is not used in the secondary circuit. The refrigeration effect produced by the secondary circuit is at a temperature of about 5° C. to 10° C., and is used to generate low condenser temperature and low absorber temperature in the primary circuit, thus allowing the evaporator 130 in the primary circuit to operate at very low evaporator temperatures, in the range of −25° C. to −30° C. for freezing applications.

As illustrated by arrow 205, the vapor generated inside the generator/absorber unit 200 of the secondary circuit passes through ball valve 250 to the ejector unit 210. The ejector unit 210 allows for an additional refrigeration loop for operation during the daytime, as well as the nighttime operation. The ejector unit 210 will induct the purified ammonia refrigerant vapor from the heat exchange coil 122 of the condenser unit 120 of the primary circuit, thus allowing evaporation of the refrigerant during the daytime and producing cooling capacity during the daytime as well.

The ejector unit 210 includes a nozzle 212, a mixing chamber 214, and a diffuser section. The acceleration of the aqua-ammonia vapor through the ejector unit 210 toward the condenser unit 220 of the secondary circuit, as illustrated by arrow 216, causes a reduction in pressure that induces the saturated ammonia vapor from the heat exchanger 122 within the condenser unit 120 of the primary circuit through valve 126 into the mixing chamber 212 of the ejector unit 210, as illustrated by arrows 123. The aqua-ammonia vapor generated by the generator/absorber unit 200 of the secondary circuit then mixes with the saturated ammonia vapor from the heat exchanger 122 inside the mixing chamber 212 of the ejector unit 210 before entering into the diffuser section of the ejector unit 210. The mixture of the aqua-ammonia vapor and the saturated ammonia vapor causes the flow to decelerate, and pressure recovery ensues. The aqua-ammonia vapor then moves into the condenser 220 unit of the secondary circuit for condensation after leaving the ejector unit 210.

The combined vapor then condenses inside the condenser unit 220 by rejecting heat to the coolant inside the heat exchange coil 222 of the condenser unit 220, passes through valve 224, and is stored as a saturated liquid refrigerant inside the refrigerant storage unit 230 in the daytime. The stored ammonia liquid refrigerant is partly utilized within the refrigeration loop of the ejector unit 210 for daytime cooling, and the rest of the saturated liquid refrigerant is stored in the refrigerant storage unit 230 to be used for cold production at nighttime.

During the daytime, the ball valve 234 and the throttling valve 232 are kept open, and ball valve 180 is kept closed. As a result, during the daytime, part of the stored liquid refrigerant inside the refrigerant storage unit 230 undergoes a throttling process and enters into the heat exchanger 122 within the condenser unit 120 of the primary circuit, as illustrated by arrows 235. Thus, evaporation takes place inside the heat exchanger 122 of the condenser unit 120 of the primary circuit, causing condensation in the primary circuit to take place at a temperature below the ambient temperature. This also causes the operation of the primary circuit to take place at a pressure much lower than the pressure that would have been maintained if the condensation took place at the ambient temperature. Therefore, the refrigeration effect produced by refrigerant evaporation within the refrigeration loop of the ejector unit 210 in the secondary circuit is utilized by the heat rejected for condensation by the condenser unit 120 in the primary circuit during the daytime.

The throttled ammonia refrigerant, after producing the required refrigeration effect inside the heat exchanger 122 within the condenser unit 120, becomes saturated ammonia vapor, which passes through valve 126 and is then inducted by the ejector unit 210, to be mixed with the aqua-ammonia vapor generated by the generator/absorber unit 200 of the secondary circuit. This mixture is returned to the condenser unit 220 of the secondary circuit for condensation, the condensate then passing through valve 224 to be stored in the refrigerant storage unit 230. This completes the refrigeration loop of the secondary circuit during the daytime.

At the start of the daytime, the generator/absorber unit 200 of the secondary circuit will be filled with cold, strong aqua-ammonia solution, while the refrigerant storage unit 230 will be empty. However, as a result of the daytime operation of the secondary circuit, the generator/absorber unit 200 will then be filled with hot, weak aqua-ammonia solution, while the refrigerant storage unit 230 will then be completely filled with the liquid ammonia refrigerant. By the start of nighttime, the generation process will be followed by the depressurization of the weak aqua-ammonia solution in the generator/absorber unit 200. For the depressurization process to take place, the solar collector unit 240 needs to be isolated from the generator/absorber unit 200 by closing valves 242 and 244, and valves 246 and 248 are opened so that the second heat exchanger 204 cools the generator/absorber unit 200.

Throughout the nighttime operation of the secondary circuit, the generator/absorber unit 200 behaves as an absorber. Depressurization of the secondary circuit continues to take place by opening valves 246 and 248, enabling the rejection of heat from the generator/absorber unit 200 by the second heat exchanger 204 within the generator/absorber unit 200. During depressurization, the saturated liquid refrigerant is kept isolated by keeping ball valve 250 and throttling valve 232 closed. After depressurization is completed, ball valve 180 and throttling valve 232 are opened. This reduces the pressure inside the refrigerant storage unit 230, causing the throttled refrigerant to flow through the second heat exchanger 104 within the generator/absorber 100, thereby producing a refrigeration effect due to the evaporation of the refrigerant. As a result, during the nighttime, the stored liquid refrigerant inside the refrigerant storage unit 230 undergoes a throttling process and enters into the second heat exchanger 104 within the generator/absorber unit 100 of the primary circuit. Thus, evaporation takes place inside the second heat exchanger 104 within the generator/absorber unit 100, causing the absorption process to take place in the primary circuit at a temperature much below the ambient temperature.

Therefore, the cooling effect produced by refrigerant evaporation in the secondary circuit is utilized for the rejection of heat from the generator/absorber unit 100 of the primary circuit during the nighttime by the absorption process. The refrigerant vapor, at illustrated by arrows 237, then moves from the second heat exchanger 104 within the generator/absorber unit 100 through valve 170 to the generator/absorber unit 200 of the secondary circuit and is absorbed by the weak aqua-ammonia solution inside the generator/absorber unit 200, thereby producing a strong aqua-ammonia solution inside the generator/absorber unit 200 of the secondary circuit by rejecting the heat of absorption to the second heat exchanger 204 within the generator/absorber unit 200.

Thus, the primary circuit provides the cooling capacity necessary for freezing applications at high ambient temperatures by using the refrigeration effect of the ejector-based secondary circuit to operate the primary circuit evaporator at low evaporator temperature (below the freezing point of water). The refrigeration effect at a temperature range of about 5° C. to 10° C. produced by the secondary circuit is used to generate a low condenser temperature (in the range of about 5° C. to 10° C.) and a low absorption temperature (in the range of about 5° C. to 10° C.). The low condenser temperature (in the range of about 5° C. to 10° C.) and the low absorption temperature (in the range of about 5° C. to 10° C.) enable the primary circuit to operate at a low evaporator temperature (in the range of about −25° C. to −30° C.) to produce the cooling capacity necessary for low temperature freezing applications in area of high ambient temperatures, e.g., at 45° C.

It can also be seen that the overall coefficient of performance (COP), which is the ratio of the total energy of evaporation (i.e., the refrigeration effect) to the total energy of generation, is comparatively less than the COP of conventional intermittent systems. Further, by integrating the secondary circuit with the primary circuit, it is possible to produce the requisite cooling capacity at low evaporator temperatures for freezing applications under high ambient temperatures by using less expensive energy generating sources, such as flat plate solar collectors, as compared to conventional intermittent systems that require expensive concentrating solar collectors to achieve the same cooling capacity.

The intermittent absorption refrigeration system 10 may include a conventional control system to control the timing of opening and closing the various valves, which may be solenoid valves or servo motor-controlled valves, in the system 10. The control system may include a processor, such as a programmable logic controller, a timer circuit, and various sensors, including photodetectors, temperature sensors, pressure sensors, etc., as is known in the art.

It is to be understood that the present invention is not limited to the embodiments described above, but encompasses any and all embodiments within the scope of the following claims.

We claim:

1. An intermittent absorption refrigeration system, comprising:
   a primary circuit having:
      primary circuit refrigeration components including a primary circuit combination generator/absorber unit, a dephlegmator, a primary circuit condenser, an evaporator, primary circuit solar collection panels, and a plurality of primary circuit heat exchangers;
      a primary circuit conduit system connecting the primary circuit refrigeration components;
      a plurality of primary circuit valves disposed in the primary circuit conduit system for controlling primary circuit coolant flow; and
      a primary circuit aqua-ammonia coolant circulating in the primary circuit conduit system, the primary circuit aqua-ammonia coolant including ammonia refrigerant and water absorber; and
   a secondary circuit having:
      secondary circuit refrigeration components including a secondary circuit combination generator/absorber unit, an ejector unit, a secondary circuit condenser, a refrigerant storage unit, secondary circuit solar collection panels, and a plurality of secondary circuit heat exchangers;
      a secondary circuit conduit system connecting the secondary circuit refrigeration components;
      a plurality of secondary circuit valves disposed in the secondary circuit conduit system for controlling a secondary circuit coolant flow; and
      a secondary circuit aqua-ammonia coolant circulating in the secondary circuit conduit system, the secondary circuit aqua-ammonia coolant including ammonia refrigerant and water absorber;
      the secondary circuit defining an ejector-based refrigeration loop operable to chill to between 5° C. and 10° C. in the daytime; and
      the primary conduit system and the secondary conduit system being interconnected so that the primary circuit condenser and the primary circuit combination generator/absorber unit are chilled by the ejector-based refrigeration loop to operate between 5° C. and 10° C., thereby permitting the primary circuit evaporator to produce refrigeration below the freezing point of water in the daytime, when ambient temperatures up to 45° C.

2. The intermittent absorption refrigeration system according to claim 1, wherein said ejector unit comprises a nozzle, a mixing chamber, and a diffuser section.

3. The intermittent absorption refrigeration system according to claim 2, wherein said dephlegmator comprises a dephlegmator heat exchanger and a dephlegmator condenser, the dephlegmator being configured to remove substantially all water from a primary circuit aqua-ammonia vapor generated by said primary circuit combination generator/absorber unit from said primary circuit aqua-ammonia coolant, the water being returned to said primary circuit combination generator/absorber unit, whereby pure ammonia refrigerant is left to circulate to said primary circuit condenser and said evaporator to produce temperatures below the freezing point of water by evaporation of the ammonia refrigerant.

4. The intermittent absorption refrigeration system according to claim 3, wherein said primary circuit conduit system and secondary circuit conduit system are interconnected such that said primary circuit condenser is connected to the mixing chamber of said ejector unit, whereby a pressure drop in the mixing chamber resulting from accelerated flow of secondary circuit aqua-ammonia vapor from said secondary circuit combination generator/absorber unit induces secondary circuit saturated liquid ammonia refrigerant in said primary circuit condenser to flow into the mixing chamber to mix with the secondary circuit aqua-ammonia vapor, said secondary circuit conduit system connecting said ejector unit to said secondary system condenser and said secondary system condenser to said refrigerant storage unit, whereby a condensed mixture of the secondary circuit aqua-ammonia vapor and the secondary circuit saturated liquid ammonia refrigerant produced in the primary circuit is stored until needed.

5. The intermittent absorption refrigeration system according to claim 4, wherein said primary circuit conduit system and said secondary circuit conduit system are interconnected such that said refrigerant storage unit is connected to said primary system condenser, said plurality of secondary circuit valves disposed in the secondary circuit conduit system include a throttling valve and a ball valve in a conduit connecting said refrigerant storage unit to both of said primary circuit condenser and primary circuit combination generator/absorber unit so that the throttling valve and the ball valve may be opened in the daytime to use the stored condensed mixture to operate said primary circuit condenser at between 5° C. and 10° C. in the daytime, as well as to operate said primary circuit combination generator/absorber unit at between 5° C. and 10° C. in the nighttime.

6. The intermittent absorption refrigeration system according to claim 5, wherein said secondary circuit combination generator/absorber unit includes a first secondary circuit heat exchanger connected to said secondary circuit solar collection panels for heating said secondary circuit aqua-ammonia coolant to produce the secondary circuit aqua-ammonia vapor circulating to the nozzle of said ejector unit.

7. The intermittent absorption refrigeration system according to claim 6, wherein said primary circuit combination generator/absorber unit includes:
 a primary circuit first heat exchanger connected to said primary circuit solar collection panels for heating said primary circuit aqua-ammonia coolant to produce the primary circuit aqua-ammonia vapor circulating to the dephlegmator; and
 a second secondary circuit heat exchanger connected to said refrigerant storage unit by interconnecting said primary circuit conduit system and said secondary circuit conduit system, said plurality of secondary circuit valves disposed in the secondary circuit conduit system including a ball valve in the conduit connecting said throttling valve to the second secondary circuit heat exchanger in said primary circuit combination generator/absorber unit, whereby the ball valve in the conduit connecting said throttling valve to the second secondary circuit heat exchanger in said primary circuit combination generator/absorber unit may be opened at nighttime after depressurization of said primary circuit combination generator/absorber unit, the stored condensed mixture of secondary circuit aqua-ammonia vapor from the secondary circuit and the secondary circuit saturated liquid ammonia refrigerant produced in the primary circuit evaporates in the second secondary circuit heat exchanger in said primary circuit combination generator/absorber unit, whereby absorption of ammonia refrigerant into said primary circuit aqua-ammonia coolant occurs at between 5° C. and 10° C.

* * * * *